No. 680,837. Patented Aug. 20, 1901.
M. A. BLAND.
MOLD FOR FIBROUS ARTICLES.
(Application filed Mar. 22, 1901.)
(No Model.)
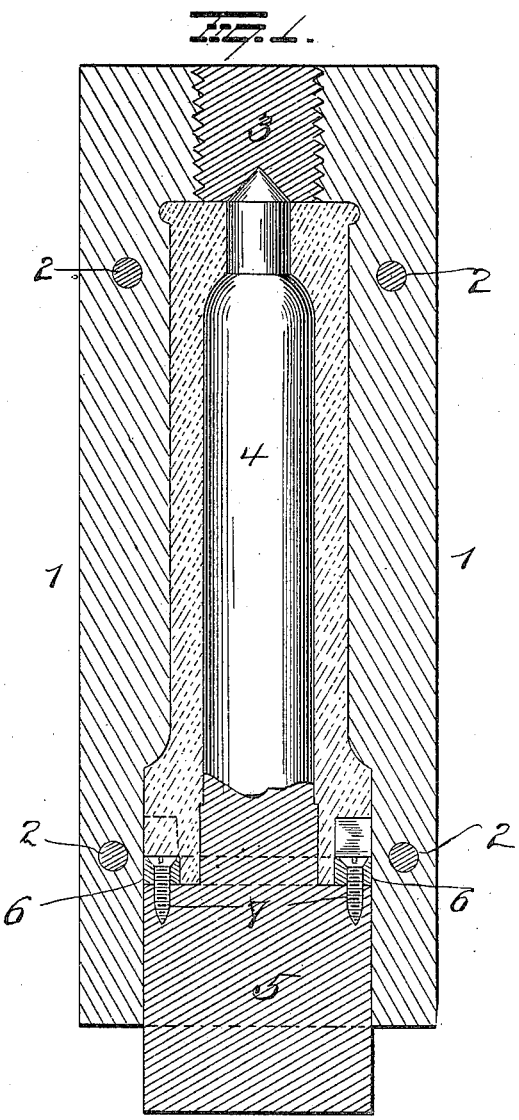
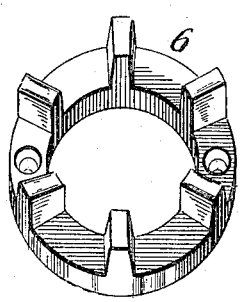
WITNESSES
E. J. Nottingham
G. F. Downing.
INVENTOR
M. A. Bland
By H. A. Seymour
Attorney

United States Patent Office.

MORTIMER A. BLAND, OF CHARLOTTE, NORTH CAROLINA.

MOLD FOR FIBROUS ARTICLES.

SPECIFICATION forming part of Letters Patent No. 680,837, dated August 20, 1901.

Application filed March 22, 1901. Serial No. 52,371. (No model.)

*To all whom it may concern:*

Be it known that I, MORTIMER A. BLAND, a resident of Charlotte, in the county of Mecklenburg and State of North Carolina, have invented certain new and useful Improvements in Molds for Fibrous Articles; and I do hereby declare the following to be a full, clear, and exact description of the invention, such as will enable others skilled in the art to which it appertains to make and use the same.

My invention relates to an improvement in molds for fibrous articles, and more particularly to molds for bobbins, the object of the invention being to provide an improved mold in which the compressing mandrel or plunger will be absolutely centered in the mold to insure the production of perfectly-formed bobbins.

With this object in view the invention consists in certain novel features of construction and combinations and arrangements of parts, as will be more fully hereinafter described, and pointed out in the claims.

In the accompanying drawings, Figure 1 is a view in section illustrating my improvements, and Fig. 2 is a detail view of the removable toothed ring on the mandrel-head.

1 represents the mold, composed, preferably, of two sections secured together by dowel-pins 2 and provided in one end with a screw-threaded plug 3, having a beveled or conical socket in its inner end to center the free end of the mandrel or plunger 4, as will more fully hereinafter appear.

The mold is cored to the shape of the bobbin, and the mandrel or plunger 4 is connected to any approved operating mechanism and sharpened or beveled at its free end to enter the socket in the plug 3, and owing to the conical shape of said socket the point of the plunger is bound to move to the center of the socket as the plunger is forced into the mold, and thereby insure the centering of the plunger. The other end of the plunger is made with an enlarged cylindrical head 5 to fit closely into the enlarged circular outer end of the mold and is provided on its inner face with a removable toothed ring 6, secured to the head 5 by screws 7 and adapted to shape the end of the bobbin to facilitate its attachment to the machine on which it is used.

The operation of my improvements is as follows: The fibrous material is placed in the mold and the plunger forced therein, the sharpened end thereof passing entirely through the fibrous material and centering in the socket in plug 3, as above explained, and thus compressing the fibrous material between the mandrel or plunger and the mold and forming the bobbin.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination of a mold having a threaded hole in one end, a block screwed in said hole and having a conical socket, and a plunger adapted to be forced into the mold and having a beveled or sharpened end to enter the socket in the block.

2. In a mold, the combination of a cored block, a plug screwed into one end of the block and having a conical socket therein, a plunger having an enlarged head to fit into the outer end of the block and a sharpened end to enter and center in the socket in the plug, and a toothed ring removably secured to the enlarged head of the plunger.

In testimony whereof I have signed this specification in the presence of two subscribing witnesses.

MORTIMER A. BLAND.

Witnesses:
ROBT. G. HAYES,
C. C. HAYES.